Feb. 18, 1964    B. D. KAPLAN ETAL    3,121,514
PRECISION DISPENSING AND MEASURING PUMP FOR FLUIDS
Filed June 9, 1960    2 Sheets-Sheet 1

BENJAMIN D. KAPLAN &
MAX M. SELBY,
    INVENTORS.

BY
    ATTORNEY.

Feb. 18, 1964   B. D. KAPLAN ETAL   3,121,514
PRECISION DISPENSING AND MEASURING PUMP FOR FLUIDS
Filed June 9, 1960   2 Sheets-Sheet 2

BENJAMIN D. KAPLAN &
MAX M. SELBY,
INVENTORS.

BY

ATTORNEY.

United States Patent Office 3,121,514
Patented Feb. 18, 1964

3,121,514
PRECISION DISPENSING AND MEASURING PUMP
FOR FLUIDS
Benjamin D. Kaplan, 8809 Pickford St., and Max M.
Selby, 621 N. Kilkea Drive, both of Los Angeles, Calif.
Filed June 9, 1960, Ser. No. 35,080
4 Claims. (Cl. 222—246)

This invention relates to a precision measuring and dispensing device for fluids, the device being essentially in the form of a pump. The device is applicable to the measuring, metering and dispensing of any fluids including fluids having varying degrees of viscosity.

The purpose of the invention is to fill a long felt need for a simple and accurate device for accurately measuring and dispensing quantities or charges of fluid and as stated, the fluid may be a viscous one.

A further object of the invention is to provide simplified and accurate means for measuring and dispensing variable quantities of fluid with simple and accurate means for adjusting the volume and/or quantity measured and dispensed.

Another object is to provide a device as in the foregoing wherein it is in the form of a pump having a reciprocating piston having simplified manually adjustable means for accurately controlling the piston stroke so as to thereby accurately control the volume of fluid measured and dispensed.

A further object is to provide a device as in the foregoing having an upright cylinder with a hopper above it and having valve means at the lower part of the cylinder to control the intake of fluid to the measuring cylinder and the dispensing of fluid therefrom.

Further objects and numerous advantages of the invention will become apparent from the following detail description and annexed drawings, wherein:

FIG. 3 is a sectional view taken along the line 3—3 of FIG. 2;

FIG. 4 is a detail view of the valve element; and

FIG. 5 is a developed view of the openings in the side walls of the barrel which controls the piston stroke.

Figure 1:
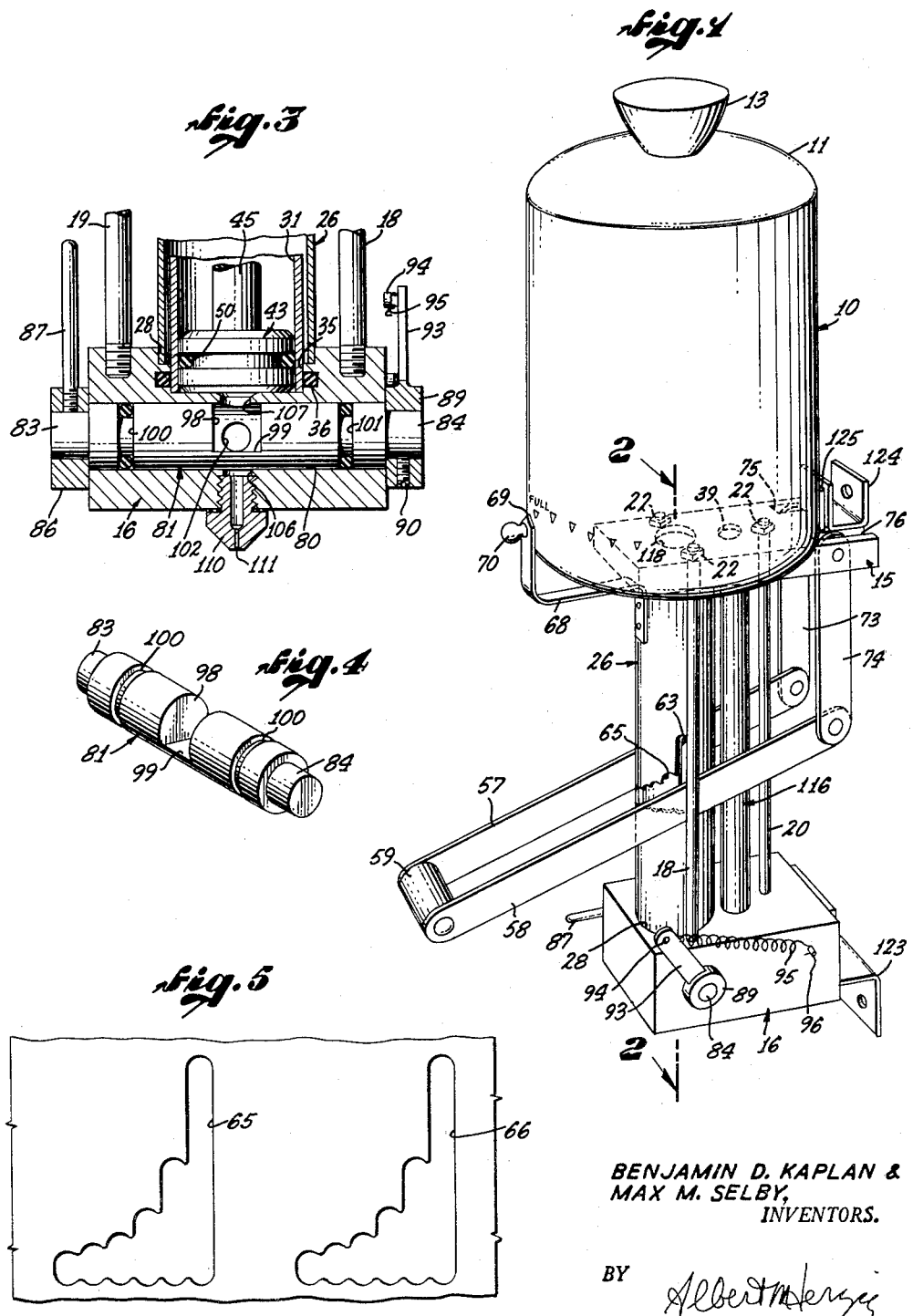
FIG. 1 is a perspective view of a preferred form of the invention.
Figure 2:
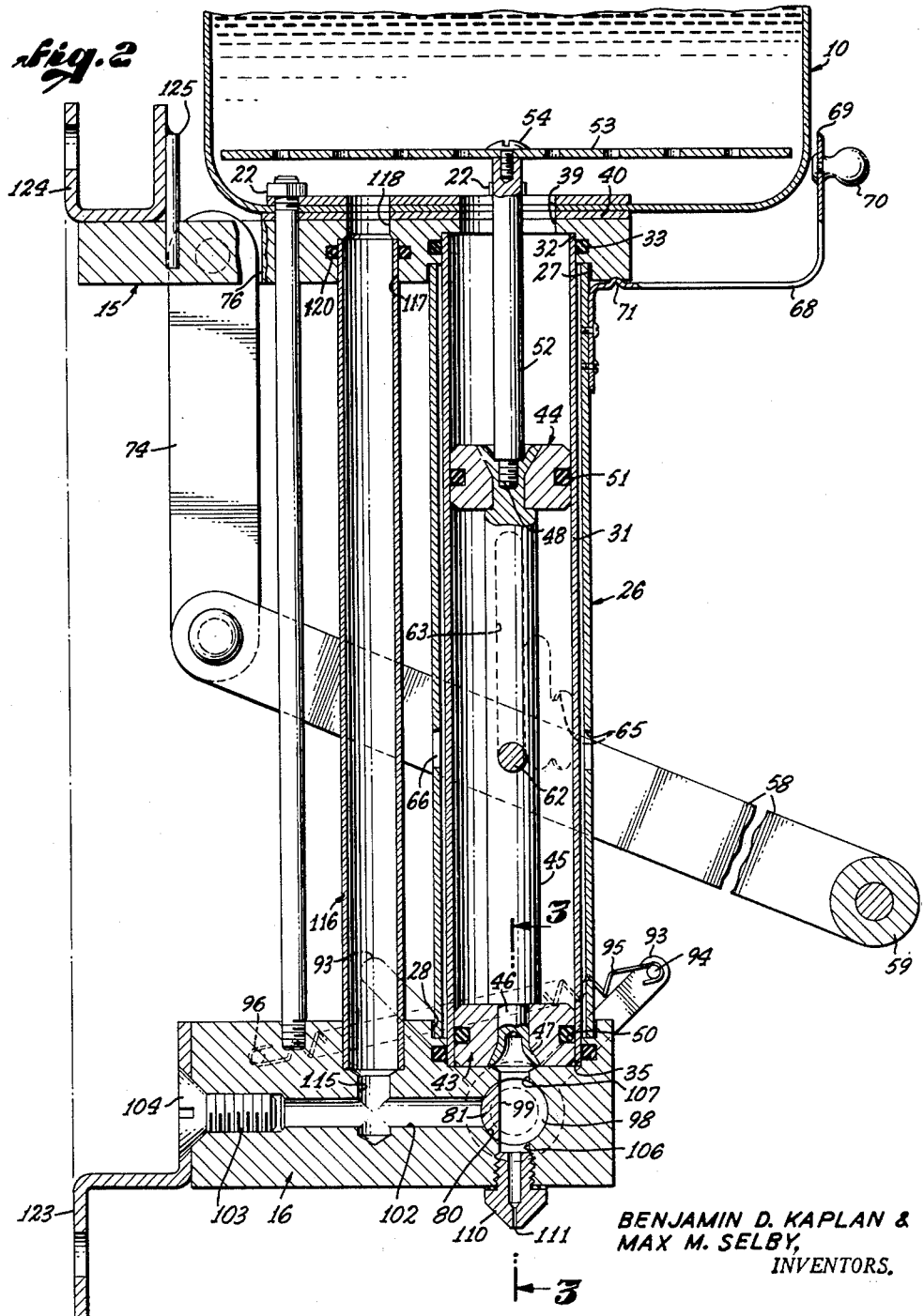
FIG. 2 is a sectional view taken along the line 2—2 of FIG. 1.

Referring now more particularly to FIG. 1 of the drawings, numeral 10 designates a generally cylindrical hopper having a domed removable top 11 and a knob 13. The hopper 10 is mounted on a block 15 which is supported above and spaced from a lower block 16. Blocks 15 and 16 are held in spaced relationship by the upright rods or spacers 18, 19, and 20. These members are threaded into the block 16 at their lower ends. At their upper ends, they are threaded and are secured to the block 15 as shown in FIG. 2 by way of nuts, as shown by way of example, at 22. Numeral 26 designates a rotatable barrel, the upper end of which rotatably fits in a counter-bore 27 in block 15 and the lower end of which rotatably fits in a counter-bore 28 in the block 16. Within the barrel 26 is the cylinder 31, the upper end of which is received in a counter-bore 32 in block 15 and which is sealed thereto by an O-ring 33 received in an annular groove in counter-bore 32 adjacent the end of the cylinder. The lower end of cylinder 31 is received in a bore 35 in block 16 and is sealed thereto by an O-ring in an annular groove in the bore 35 adjacent the end of the cylinder.

Numeral 39 designates a bore in block 15 communicating with the counter-bores 32 and 27 and with aligned bores or openings in a spacer or gasket plate 40 and in the bottom of hopper 10. The hopper 10 is mounted on block 15 with the spacer or gasket plate 40 in between and is removable by removing nuts 22.

Within the cylinder 31 is a lower piston 43 and an upper piston 44 connected by stem or rod 45. The lower end of stem 45 is of smaller diameter and is received in a bore in piston 43 as shown at 46. The bore in piston 43 is outwardly flared at its lower end. There is a bore in the lower end part 46 of the stem 45 and the side walls of this bore are flared outwardly as shown at 47 to engage with the flared bore in the piston 43 and to retain the piston 43 on the end of stem 45. The piston 43 has an annular groove as shown in which is seated an O-ring 50 which seals the piston to the interior of the cylinder 31.

Piston 44 is of similar construction preferably being attached to the end of stem 45. It also has an annular groove in which is seated an O-ring 51 which seals to the interior of cylinder 31. The end of stem 45 is received in a bore in piston 44 as shown. It is flared as shown to engage a conical part of the bore in piston 44. The end of the stem 45 has a threaded bore 48.

Numeral 52 designates a stem threaded into the threaded bore 48 and extending through the bore 39 into the hopper 10. On the end of this stem is a perforated disc 53 attached by a screw 54 which is reciprocated when the piston is operated for agitating fluid in the hopper 10 as will be described.

The pistons are operated by an operating handle having two side members 57 and 58 connected by a joining member 59 as may be seen in FIG. 1. The operating handle has a transverse pin 62 extending between its side members which extends transversely through the stem 45. The pin 62 operates in vertical slots 63 in intermediate parts of the side walls of the cylinder 31. It also extends through openings 65 and 66 in the side walls of the barrel 26 having the shape as shown in FIG. 5. FIG. 5 is a developed view showing these openings in a plane to illustrate the shape they have in the cylindrical side walls of the barrel 26. Actually, these openings are in the form of vertical contiguous slots of different axial extent so that openings of the shape shown are formed.

Attached to the upper end of the barrel 26 is an extending bracket 68 having a pointer 69 at its end and an adjusting knob 70. The pointer 69 operates opposite graduations around the bottom of the hopper 10 to indicate the length of stroke that will be made by piston 43 and accordingly, the volume of fluid measured and dispensed. That is, the barrel 26 with the member 68 is rotatable to bring different portions of the openings 65 and 66 into the line of vertical movement of the pin 62. As can be seen for each rotatably adjusted position of barrel 26, as indicated by pointer 69, the openings 65 and 66 will allow an exact predetermined length of stroke of the pistons by the handle 59. The bracket arm 68 has a detent protuberance 71 engageable with similarly shaped depressions in the lower side of block 15 to provide for exact feed.

The ends of members 57 and 58 are pivotally attached to suspending bracket arms 73 and 74 which are in turn pivoted at their upper ends to the block 15 in slots as shown at 75 and 76. Since the pin 62 moves in a vertical line, the ends of arms 57 and 58 necessarily move transversely so that it is necessary that they be pivoted to the brackets or arms 73 and 74 which allow swinging or transverse movement.

The block 16 embodies valve means for controlling the admission and discharge of fluid to the measuring and dispensing cylinder. The block 16 has a transverse bore 80 in which is received a cylindrical valve member 81 shown in detail in FIG. 4. This valve member has ends of smaller diameter as shown at 83 and 84 which extend beyond the ends of the bore 80. Attached on one end 83 is a circular member 86 carrying an operating handle 87 for the valve. On the other end is a circular member 89 attached by set screw 90 and having an extending arm 93 carrying a pin 94 to which is attached a biasing spring 95 attached at the other end to the block 16 at 96. The valve member 81 has a central groove or slot 98 having a flat bottom 99. Valve member 81 is sealed in bore 80 by O-rings in the annular grooves at 100 and 101.

Communicating with the bore 80 is a transverse bore 102 in the block 16 in the end of which is a threaded plug 103 having a countersunk head 104. The bore 80 may also have communication with vertical transverse bores 106 and 107 in the block 16. The bore 107 communicates with the interior of cylinder 31. The bore 106 is threaded and it receives a nipple 110 having a metering orifice 111 in it.

The valve member 81 is rotatable through 90 degrees so that the portion or web at the bottom of slot 98 can close or open the ports either at the end of bore 102 or bore 106. Normally, the spring 95 biases the valve member 81 to close bore 106 to prevent any discharge of fluid from the measuring and dispensing device or pump.

Numeral 115 designates a transverse bore communicating with bore 102 and with a counter-bore in the block 16 in which is received the end of a vertical tube 116. The upper end of this tube is received in a counter-bore in block 15 as designated at 117 which connects to a bore 118 communicating with the hopper 10. The counter-bore 117 has an annular groove with a sealing O-ring 120 fitting in it which seals the upper end of tube 116.

The entire device may be mounted by suitable brackets, such as the bracket 123 shown in FIGS. 1 and 2, attached to block 16. Numeral 124 designates a second bracket which is U-shaped as shown. Preferably, it is secured to rod members as shown at 125 which are received in and upstand from bores in the block 15.

From the foregoing, the operation of the device will readily be understood by those skilled in the art. The valve member 81 is normally positioned to close off the bore 106 to prevent discharge of fluid from the cylinder 31. In this position, the bore 102 is in communication with bore 107. If it is now desired to dispense a predetermined measured quantity of fluid, the barrel 26 is set to the necessary rotated position to pre-set the length of stroke of the piston to discharge the required amount as indicated by the pointer 69. This adjustment sets the necessary length of slot opening as previously described at the position of travel of pin 62. The handle 59 may now be lifted through a stroke of this predetermined length. Fluid from the hopper 10 passes downwardly through the tube 116 through the bores 102 and 107 filling the volume of displacement of the piston 43 with a quantity of fluid to be dispensed. At the same time, the fluid above piston 44 is forced upwardly through the opening 39 so that a column of fluid is discharged upwardly into the hopper 10 to agitate and mix the fluid therein. On the upstroke, the movement of disc 53 also serves to agitate the fluid which is further agitated by this disc on the downstroke of the pistons. Prior to the downstroke, the lever 87 is moved into the position shown in FIG. 2 against the force of spring 95 to operate valve 81 to close off bore 102 and provide for communication between bore 107 and bore 106 and to the discharging metering nipple 110. The pistons are now moved down through an accurately predetermined stroke in the manner described and the fluid in the measuring chamber formed by the lower end of cylinder 31 is forced out through the metering orifice 111. In this manner, as may be seen, a very accurately measured and metered quantity of fluid is dispensed and the quantity or volume dispensed can be nicely adjusted as desired simply by rotating the barrel 26 to its various positions. After discharge of a metered quantity, the lever 87 is released and the port in the end of bore 106 is again closed off.

It should be understood that prior to the dispensing of a measured quantity of fluid, the fluid may be thoroughly mixed and agitated by moving the handle 59 up and down with the valve 81 positioned to allow back flow up through the tube 116. When the handle is moved up, fluid is forced up into the hopper 10 as previously described. When the handle is moved down, piston 43 forces fluid back up through the tube 116. At this time, the disc 53 will be moving down against the upflow from the tube 116 so that the fluid will be thoroughly mixed and agitated. After this mixing and agitation, the dispensing operation may be performed. As may be seen, therefore, the particular construction makes possible thorough mixing and agitation of the material in the hopper. The arrangement provides for surge action of the fluid in combination with opposite movement of the agitator plate which is highly adaptable for thorough mixing of materials such as joints and/or pigments, for example.

From the foregoing, those skilled in the art will observe that the device or pump as described provides a simplified, effective, and easily operated means capable of fulfilling the need for a mechanism operable to accurately measure, meter and dispense predetermined quantities of a fluid, such as a viscous fluid, which may be more or less difficult to handle ordinarily.

The foregoing disclosure is representative of a preferred form of the invention and is to be interpreted in an illustrative rather than a limiting sense, the invention to be accorded the full scope of the claims appended hereto.

What is claimed is:

1. In a precision dispensing and measuring device for fluids in combination, a hopper for the fluid, a cylinder depending below the said hopper, a piston in the cylinder and a manual means for actuating the piston, means at the lower end of the cylinder including a valve having communication with the cylinder and having a discharge port for discharging fluid, means for providing communication with the hopper and a port controlled by the valve means providing communication with the cylinder, means for operating the valve means whereby the volume displaced by the piston is filled with fluid from the hopper, the valve being movable to a position to close the intake to the cylinder and to open the discharge port whereby upon operation of the manual operating means a precisely measured quantity of material is dispensed, a second piston on the piston rod spaced from the first piston and positioned to thrust fluid upwardly in said cylinder on the upstroke of the pistons, and the said agitating means including a member transversely positioned on the end of the piston rod in the said hopper in a position to agitate the fluid forced upwardly in the cylinder by the upper piston therein, the said valve means comprising a cylindrical valve member rotatable in a transverse bore at the lower end of the said cylinder, tubular means parallel to said cylinder communicating with said hopper and connecting to a channel having a port controlled by said cylindrical valve member, said cylindrical valve member having a position providing communication between said hopper and the volume displaced by said piston and a position cutting off said communication and providing communication between the volume displaced by the piston and a discharge port.

2. In a precision dispensing and measuring device for fluids in combination, a hopper for the fluid, a cylinder depending below the said hopper, a piston in the cylinder and manual means for actuating the piston through a predetermined variable stroke distance including means for adjusting said disance, means at the lower end of the cylinder including a valve having communication with the cylinder and having a discharge port for discharging fluid, means providing communication with the hopper and a port controlled by the valve means providing communication with the cylinder, and means for operating the valve means whereby the entire volume displaced by the piston on each stroke is filled with fluid from the hopper, the valve being movable to a position to close the intake to the cylinder and to open the discharge port whereby upon operation of the manual operating means a precisely measured quantity of material is dispensed, determined by said stroke distance, a rotatable sleeve around the cylinder having opening means therein, the manual operating means comprising a lever having a pin engageable with the opening means, and the opening means having a variable axial extent and the said sleeve being rotatable whereby to accurately control the length of the piston stroke.

3. In a precision dispensing and measuring device for fluids in combination, a hopper for the fluid, a cylinder depending below the said hopper, a piston in the cylinder and manual means for actuating the piston through a predetermined variable stroke distance including means for adjusting said distance, means at the lower end of the cylinder including a valve having communications with the cylinder and having a discharge port for discharging fluid, means providing communication with the hopper and a port controlled by the valve means providing communication with the cylinder, and means for operating the valve means whereby the entire volume displaced by the piston on each stroke is filled with fluid from the hopper, the valve being movable to a position to close the intake to the cylinder and to open the discharge port whereby upon operation of the manual operating means a precisely measured quantity of material is dispensed, determined by said stroke distance, a piston rod connected to said piston and extending upwardly into said hopper and having means for agitating the fluid in the hopper on each stroke of the piston in both directions.

4. A device as in claim 1, including a second piston on the piston rod spaced from the first piston and positioned to thrust fluid upwardly in said cylinder on the up-stroke of the pistons and the said agitating means including a member transversely positioned on the end of the piston rod in the said hopper in a position to agitate the fluid forced upwardly in the cylinder by the upper piston therein.

References Cited in the file of this patent

UNITED STATES PATENTS

| | | |
|---|---|---|
| 914,289 | Koenigkramer et al. | Mar. 2, 1909 |
| 1,066,660 | Ross | July 8, 1913 |
| 1,175,060 | Hibschman | Mar. 14, 1916 |
| 1,724,766 | McCauley | Aug. 13, 1929 |
| 2,988,248 | Bender et al. | June 13, 1961 |
| 3,052,376 | Fogg | Sept. 4, 1962 |